April 22, 1969  C. W. NEEFE  3,440,306
PROCESS FOR MAKING AN IMPROVED BIFOCAL LENS
Filed July 11, 1966

Charles W. Neefe
INVENTOR.

United States Patent Office 3,440,306
Patented Apr. 22, 1969

3,440,306
PROCESS FOR MAKING AN IMPROVED
BIFOCAL LENS
Charles W. Neefe, Box 361, Big Spring, Tex. 79720
Filed July 11, 1966, Ser. No. 570,107
Int. Cl. B29d 11/00
U.S. Cl. 264—1                                              4 Claims

ABSTRACT OF THE DISCLOSURE

Bifocal lenses are constructed by positioning a preformed body having a high refractive index within a mold and then casting a polymerizable transparent liquid of a lower refractive index within the mold to cover the preformed body. The transparent liquid is cured to form a monolithic mass and then the monolithic mass is shaped to a bifocal lens.

---

This is a continuation-in-part of application Ser. No. 798,874, filed Mar. 12, 1959, and now abandoned.

Bifocal contact lenses composed of plastics of two different refractive indexes, as are now being made, have round segments with the optical center located at the geometric center of the reading segments. This causes a degree of image displacement due to the base down prism encountered with the transition from the distant segment to the near segment. Also the upper edge of the segment is curved with a radius equal to the radius of the segment.

The herein disclosed bifocal contact lens overcomes these disadvantages. Using this process, any shape segment may be made, and we will use the semi-circle with a straight top as an example only. It is understood that any segment shape is possible and that any placement of the optical center is also possible with the present invention. The optical center of the segment may even be placed off the segment proper, if desired. Also, many suitable types of plastics and adhesives may be substituted for the ones stated herein.

Your attention is directed to the accompanying drawing, in which.

The process for making the lens will now be described in detail.

Figure 1:
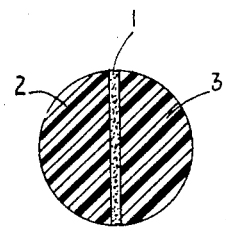
FIGURE 1 shows two high refractive index blocks cemented together by a layer of beeswax cement.
Figure 2:
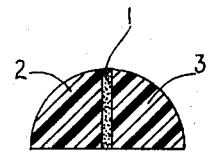
FIGURE 2 shows the segment block in section after it has been ground and polished.

Two pieces of high index plastics, such as styrene index 1.60 or polyester index 1.53, are shaped into semi-circular blocks as shown in FIGURE 1, their flat side is then ground and finished to a satin smooth surface, but not polished. The plastic pieces 2 and 3, FIGURE 1, are then warmed and cemented together using beeswax 1, as shown in FIGURE 1. After cooling, the two segments are cut and polished to the desired radius as shown in FIGURE 2. The two pieces are again warmed, taken apart and all beeswax is removed with a solvent.

Figure 3:
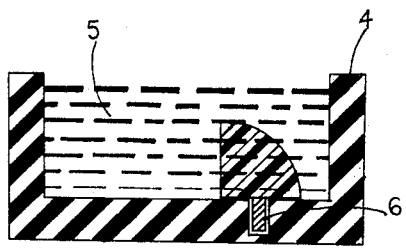
FIGURE 3 shows the segment block placed in a mold according to the invention.

An aligning pin 6, shown in FIGURE 3, is attached to the geometric center of one of the segments and inserted into the hole provided in the silicone rubber mold 4 shown in FIGURE 3. The high index segment is positioned in the mold with the polished convex spherical surface facing upward and the flat surface toward the center of the mold cavity. The mold cavity is filled, covering the high refractive index segment, with liquid methyl methacrylate to which has been added a room temperature active catalyst. The surface of the high index segment is treated with 95% ethyl alcohol prior to being placed in the mold. This alcohol treatment improves the bond between the reading segment and the distant portion. A coating such as titanium dioxide may be deposited upon the polished surface to improve adhesion if desired. The mold and contents are allowed to remain quiescent until the liquid monomer has polymerized. The blank is then heated to remove all traces of monomer and to release internal stress by annealing. Fluorescent material may be added to the surface coating to make the segment visible under ultra violet light.

Figure 4:
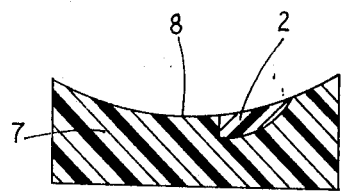
FIGURE 4 shows the polymerized lens blank with the concave surface finished.
Figure 5:
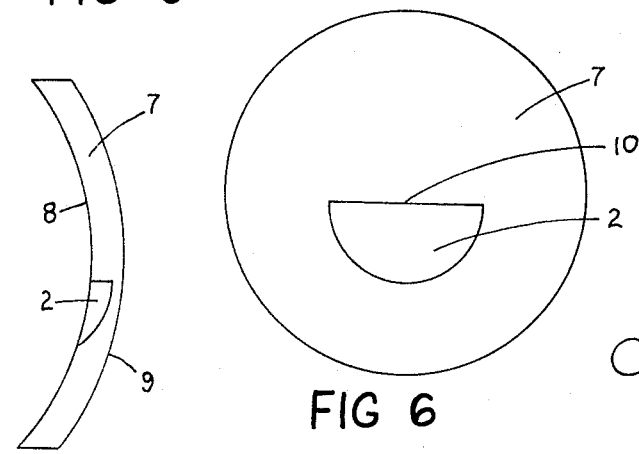
FIGURE 5 shows the finished lens in section.

The concave surface 8 is cut as shown in FIGURE 4, using a much longer radius than is used to form the segment block 2 and 3. The depth of the cut 8 in FIGURE 4 determines the size of the segment 2 in FIGURE 4. The convex surface 9 shown in FIGURE 5 is cut in the usual manner to complete the optical surface of the lens.

Figure 6:
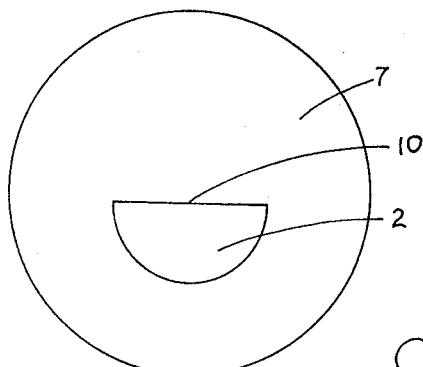
FIGURE 6 shows a front view of the finished lens.

FIGURE 6 shows the contact lens from the front. The optical center of the reading segment 10 in FIGURE 6 is located at the top of the reading segment. No apparent image displacement will be present during the transition from the distant to near segment if the optical center is located at the top edge of the reading segment.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description or shown in the accompanying drawings shall be interpreted as illustrative and not in a limiting sense.

I claim:
1. A process for making a bifocal lens comprising forming a curved optical surface on a cured block of transparent polymerized plastic material having a high refractive index, attaching an aligning pin to said cured block, placing said pin in an aperture in a mold thereby aligning the cured block in the mold cavity, casting into the mold cavity about said cured block a transparent polymerizable liquid having a volume substantially greater than the volume of said cured block and having a refractive index lower than said high refractive index,
   curing said polymerizable liquid to form with said cured block a monolithic transparent mass, and
   forming a lens with two different focal lengths from said monolithic mass, with a portion of said cured block forming the central lens portion.

2. The process defined in claim 1 wherein said cured block has the configuration of a flat-faced spherical segment.

3. The process defined in claim 1 and further comprising:
  attaching two circular halves of a transparent polymerized plastic material together to form a cylindrical section,
  polishing surfaces of the attached circular halves to a desired optical surface, and
  detaching the parts of said circular halves from one another for use as said cured block.

4. The process defined in claim 1 wherein the surface of said cured block is treated with a solvent material prior to the casting of said polymerizable liquid for improvement of adhesion between said materials of different refractive indexes.

References Cited

UNITED STATES PATENTS

| | | | |
|---|---|---|---|
| 3,034,403 | 5/1962 | Neefe | 264—1 |
| 3,270,099 | 8/1966 | Camp | 264—1 |
| 2,269,037 | 1/1942 | Oker | 264—1 |
| 2,635,290 | 4/1953 | Yuhas | 264—1 |
| 3,109,696 | 11/1963 | Whitney | 264—1 |

JULIUS FROME, *Primary Examiner.*

A. H. KOECKERT, *Assistant Examiner.*

U.S. Cl. X.R.

264—265, 275; 351—161